US005286521A

United States Patent [19]

Matsuda et al.

[11] Patent Number: 5,286,521

[45] Date of Patent: Feb. 15, 1994

[54] REUSABLE INK SHEET FOR USE IN HEAT TRANSFER RECORDING AND PRODUCTION PROCESS THEREOF

[75] Inventors: Genichi Matsuda, Kawasaki; Takesi Sugii, Nagano, both of Japan

[73] Assignee: Fujitsu Limited, Kanagawa, Japan

[21] Appl. No.: 905,302

[22] Filed: Jun. 29, 1992

Related U.S. Application Data

[62] Division of Ser. No. 495,560, Mar. 19, 1990, Pat. No. 5,151,326.

[30] Foreign Application Priority Data

Mar. 20, 1989 [JP] Japan .................................. 1-68647

[51] Int. Cl.$^5$ ............................................. B32B 9/00

[52] U.S. Cl. .................................... 427/146; 428/195; 428/402; 428/407; 428/488.1; 428/488.4; 428/913; 428/914

[58] Field of Search ................ 427/146; 428/195, 484, 428/488.1, 488.4, 402, 407, 913, 914

[56] References Cited

U.S. PATENT DOCUMENTS

| | | | |
|---|---|---|---|
| 3,368,985 | 2/1968 | Wissinger et al. | 260/23 |
| 3,852,091 | 12/1974 | Newman | 117/36.1 |
| 4,661,393 | 4/1987 | Uchiyama et al. | 428/200 |

FOREIGN PATENT DOCUMENTS

| | | | |
|---|---|---|---|
| 0063000 | 1/1983 | European Pat. Off. . | |
| 3315249 | 10/1984 | Fed. Rep. of Germany . | |
| 3635141 | 3/1988 | Fed. Rep. of Germany . | |
| 59-165691 | 9/1984 | Japan | 428/195 |
| 63-194984 | 12/1988 | Japan | 428/195 |

*Primary Examiner*—Patrick J. Ryan
*Assistant Examiner*—William A. Krynski
*Attorney, Agent, or Firm*—Armstrong, Westerman, Hattori, McLeland & Naughton

[57] ABSTRACT

A reusable, heat transfer recording ink sheet using an ink containing, in addition to a colorant and a vehicle, ethylene/vinyl acetate-coated fine powders capable of being partially transferred to an inkreceiving recording medium for each transfer recording, the ethylene/vinyl acetate having a number average molecular weight of 30,000 or less and a vinyl acetate unit thereof being in the range of 18 to 45% by weight of the copolymer. The ink sheet ensures that prints having a sufficiently high density of print and an excellent fixing of the ink to the recording medium are obtained, together with a remarkably increased number of the repetitions of use of the sheet. A production process of the ink sheet is also provided.

11 Claims, 16 Drawing Sheets

DEPENDENCY OF PEELING STRENGTH ON VA CONTENT

DEPENDENCY OF SHAPPNESS OF PRINTS ON VA CONTENT

NUMBER OF REPETITION OF PRINTING (TIMES)

VARIATION OF PRINT DENSITY WITH INCREASE OF PRINTING STEPS

VARIATION OF PRINT DENSITY WITH INCREASE OF TEMPERATURE

VARIATION OF PRINT DENSITY WITH INCREASE OF PRINTING STEPS

DEPENDENCY OF INK TRANSFER AND ADHESION ON VA CONTENT

EFFECT OF LIGHT STABILIZER ON PRINT DENSITY

REUSABLE INK SHEET FOR USE IN HEAT TRANSFER RECORDING AND PRODUCTION PROCESS THEREOF

This is a division of application Ser. No. 07/495,560 filed Mar. 19, 1990, now U.S. Pat. No. 5,151,326.

BACKGROUND OF THE INVENTION

1. Field of the Invention

The present invention relates to a reusable or "multitime" ink sheet for use in heat transfer recording, and a production process thereof. More particularly, the present invention relates to a reusable ink sheet disposed between a printing head and printing paper in a thermal printer of a word processor, personal computer and other devices. The ink sheet according to the present invention can be advantageously used in the heat transfer recording process for an increased number of the repetition of use without deteriorating a thermal transfer capability, which relies upon a release of a portion of the ink from the sheet, and other properties thereof.

2. Description of the Related Art

Many types of reusable ink sheets have been proposed in the field of heat transfer recording. For example, Japanese Unexamined Patent Publication (Kokai) No. 57-160691 and the corresponding U.S. Pat. No. 4,661,393 to Uchiyama et al. teach an improved heat transfer recording ink sheet which comprises a substrate having formed thereon a layer of ink composition, said ink composition consisting of:

a transfer component of a solvent dye and at least one low-melting compound having a melting point in the range from 40° to 100° C. and containing at least one of hydroxyl and ethylene oxide; and at least one inorganic or organic fine powder having a particle size in the range from 0.01 to 200 82 m, each said fine powder being insoluble and dispersible in an organic solvent.

The use of the ink sheet disclosed in the above U.S. Patent is illustrated in FIG. 1. As shown in FIG. 1, layer 3 of the ink composition is coated on one surface of the substrate 2. When heat and pressure are applied to the ink sheet 1 through a thermal printing head (not shown) in the direction of arrow, the applied heat is transmitted through the substrate 2 to reach the ink composition layer 3, whereby the ink composition distributed therein is melted and expressed therefrom. The expressed ink composition is then transferred to a receiver sheet 10 of plain recording paper to form a transferred recording 4. Thereafter, the receiver sheet 10 is peeled off from the ink sheet 1. Nevertheless, this ink sheet has a problem in that a nonuniform contact between the receiver sheet 10 and the ink composition layer 3, and accordingly a deterioration of the print quality occurs because a surface of the layer 3 is roughened, due to an unsatisfactory porous structure of the fine powder, by a repeated use of the sheet.

To solve the above-described problem, Uchiyama et al. proposed a further improved ink sheet. This ink sheet 1, as shown in FIG. 2, is characterized by comprising an ink layer 3 disposed through an interlayer 5 such as polyamide onto a substrate 2 such as a plastic sheet, for example, polyester, and containing a spongy structure of vinyl acetate resin (for example, ethylene/vinyl acetate copolymeric resin)-coated fine powders 7 such as carbon black. A transfer component 6 consisting of a black dye and a low-melting binder material such as aliphatic amide is impregnated in the spongy structure. Note, the spongy structure has a higher strength than that of the above-described porous structure of the fine powder and therefore, prevents the deterioration of the print quality. This ink sheet is disclosed in Japanese Unexamined Patent Publication (Kokai) No. 59-165691.

Nevertheless, another problem to be solved arises with regard to the ink sheet 1 of FIG. 2, after repeated use of the sheet (see, FIG. 3), in that fine powders and a coating of ethylene/vinyl acetate surrounding the powders remain on the substrate 2 during the repeated use of the sheet; this is because they have a higher softening point than that of the low-melting material, and therefore, are not melted when the sheet is heated by the printing head, and only the transfer component 6 is melted. Accordingly, the transfer component 6 is migrated through gaps between the fine powders and portions thereof then transferred from the layer 3 to the receiver sheet 10. Although a good repeatability is obtained as a result of the above-described spongy structure, a good print density as high as that of the single use or disposable ink sheet cannot be obtained because the amount of transfer component released at each printing is relatively small.

Another type of ink sheet or reusable heat transfer ink ribbon is well-known from Japanese Unexamined Patent Publication (Kokai) No. 63-194984. The heat transfer ink ribbon of this Japanese Kokai comprises a substrate 2 and a layer 8 of molten ink applied to one surface of the substrate 2, as shown in FIG. 4, and is characterized in that this molten ink contains a specific binding agent such as ethylene/vinyl acetate copolymer, together with a colorant such as carbon black and a dispersion aid for the colorant. The binding agent is represented by the formula:

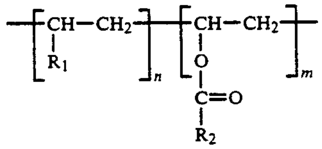

in which $R_1$ is a lower alkyl or hydrogen, $R_2$ is a lower alkyl and a ratio of m/n is from 0.01. to 0.07. The described ink ribbon enables the molten ink to be completely utilized, and provide an improvement of the sharpness of the prints. As described in the working example of this Kokai, the molten ink is effectively consumed within several uses of the ribbon, but since the ink layer has a uniform composition but does not constitute a porous or spongy structure as in the above-discussed ink sheets, portions of the molten ink are not transferred from the ink layer to a surface of the printing paper. As can be seen from the cross-sectional view of FIG. 5, a substantial portion of the molten ink of the ink layer 8 is transferred to the printing paper 10 after the ribbon is once used, and thus the printing repeatability of this ribbon is not good.

In addition to the poor printing repeatability, the ink ribbon of Japanese Kokai 63-194984 has a drawback in that it is difficult to fix the ink to the paper, and therefore, the printed ink is easily removed by rubbing with the finger or by friction with other paper. The ink is easily rubbed of because the ink ribbon has a low peeling strength. The basis for this conclusion can be found in the graph of FIG. 10, showing a dependency of the peeling strength on the vinyl acetate (VA) content of the ethylene/VA copolymer described hereinafter. Namely, the m/n ratio of 0.01 to 0.07 for the above-described formula means that the VA content of the EVA copolymer is from 3 to 17.7% by weight of the copolymer. If this range of the VA content is applied to the graph of FIG. 10, it is obvious that the peeling strength of this ink ribbon is unacceptably low. Accordingly, this and other drawbacks of the above-discussed prior art ink sheets and ink ribbons must be removed to satisfy the requirements of recent, advanced heat transfer recording processes.

SUMMARY OF THE INVENTION

An object of the present invention is to provide an improved ink sheet which can be repeatedly used for the heat transfer recording, and which ensures a good printing repeatability, high print density, and good fixing of the ink to a recording medium such as printing paper, together with an increased number of repetitions of use.

Another object of the present invention is to provide an improved ink sheet which can be used at a relatively lower temperature without losing the excellent properties described above.

Another object of the present invention is to provide an improved ink sheet which is particularly suitable for solid black printing.

Still another object of the present invention is to provide an improved ink sheet which can be stored for a long period of time without a deterioration of the excellent properties thereof.

Still another object of the present invention is to provide an improved process for producing the ink sheets according to the present invention.

These and other objects of the present invention will be explained in the following description of the preferred embodiments of the present invention.

The inventors found that the above objects can be attained by using fine powders of a solid material coated with an ethylene/vinyl acetate copolymer having a number average molecular weight of 30,000 or less and a vinyl acetate content of 18 to 45% by weight of the copolymer.

In one aspect of the present invention, there is provided a reusable, heat transfer recording ink sheet which comprises a substrate and an ink layer applied to one surface of the substrate, the ink containing:

at least one dye and/or pigment as a colorant;

a low-melting compound as a vehicle; and ethylene/vinyl acetate-coated fine powders having a particle size of 0.01 to 200 μm and dispersed in a mixture of the dye and/or pigment and the low-melting compound, which are transferred to an inkreceiving recording medium together with the mixture for each heat transfer recording, and in which the ethylene/vinyl acetate has a number average molecular weight of 30,000 or less and contains a vinyl acetate unit in an amount of 18 to 45% by weight of the copolymer.

In another aspect of the present invention, there is provided a process for the production of a reusable heat transfer recording ink sheet which comprises coating on a surface of the substrate an ink which contains:

at least one dye and/or pigment as a colorant;

a low-melting compound as a vehicle; and ethylene/vinyl acetate-coated fine powders having a particle size of 0.01 to 200 μm and dispersed in a mixture of the dye and/or pigment and the low-melting compound after the preparation of said mixture, which are transferred to an ink-receiving recording medium together with the mixture for each head transfer recording, and in which the ethylene/vinyl acetate has a number average molecular weight of 30,000 or less and contains a vinyl acetate unit in an amount of 18 to 45% by weight of the copolymer.

DESCRIPTION OF THE PREFERRED EMBODIMENTS

Figure 1:
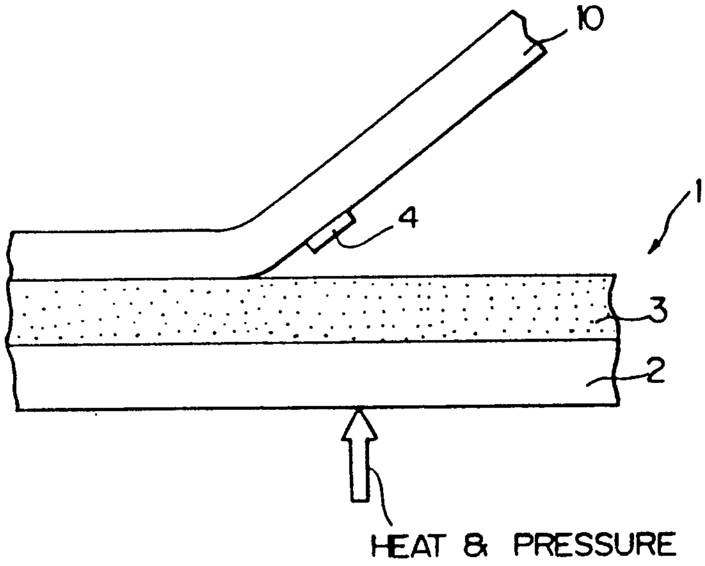
Fig 1 PRIOR ART
FIG. 1 is a cross-sectional view showing the use of the first prior art ink sheet.
Figure 2:
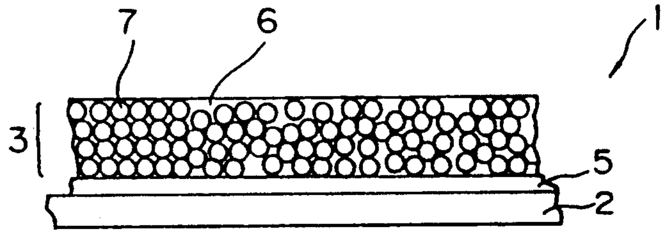
Fig. 2 PRIOR ART
FIG. 2 is a cross-sectional view of the second prior art ink sheet.
Figure 3:
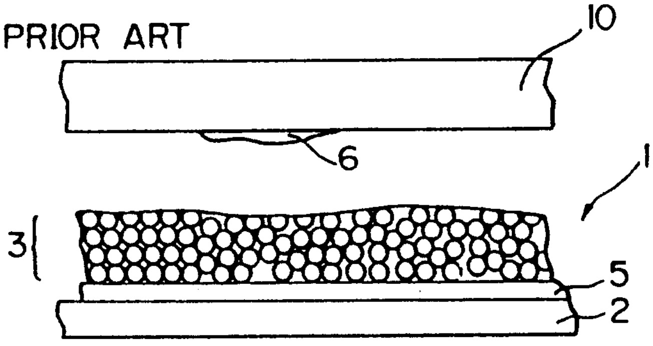
Fig.3 PRIOR ART
FIG. 3 is a cross-sectional view showing the use of the ink sheet of FIG. 2.
Figure 4:
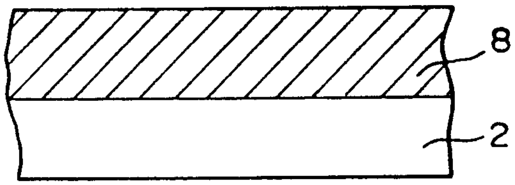
Fig.4 PRIOR ART
FIG. 4 is a cross-sectional view of the prior art ink ribbon.
Figure 5:
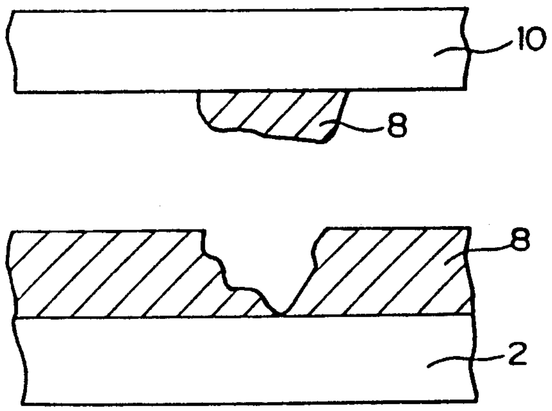
Fig.5 PRIOR ART
FIG. 5 is a cross-sectional view showing the use of the ink sheet of FIG. 4.
Figure 6:
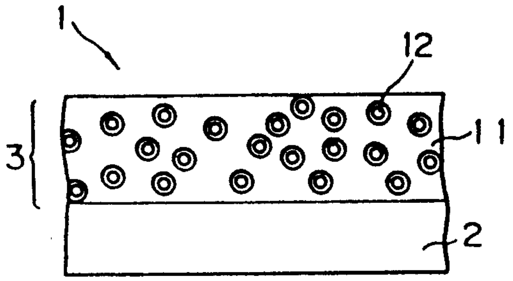
FIG. 6 is a cross-sectional view of the reusable ink sheet according to the present invention.

A typical structure of the reusable ink sheet according to the present invention is illustrated in FIG. 6. The ink sheet 1 comprises a substrate 2 having an ink layer 3 applied to one surface thereof. No interlayer is sandwiched between the ink sheet 1 and the substrate 2. The ink composition of the layer 3 consists of an ink 11 and EVA-coated fine powders 12. The ink 11 is a mixture of at least one dye and/or pigment as a colorant and a low-melting compound as a vehicle, but the term "ink" is sometimes used herein to mean the ink composition or a mixture of the colorant, vehicle and EVA-coated fine powders. Note, to facilitate an understanding of the constitution of the ink sheet 1, the configuration and distribution of the EVA-coated fine powders 12 as well as a thickness of the substrate 2 and layer 3 are shown on an exaggerated scale in this and other drawings.

Figure 9:
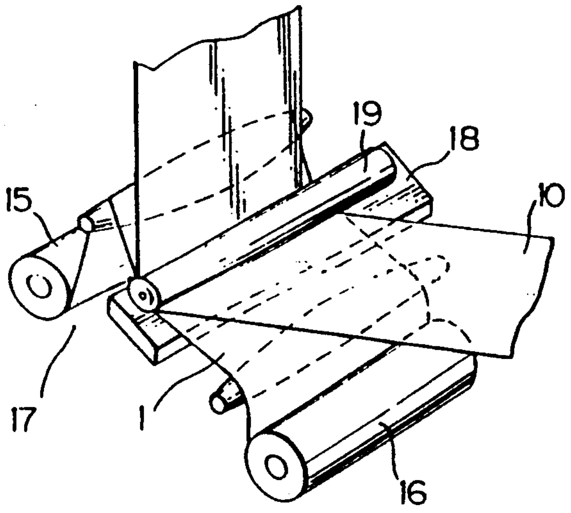
FIG. 9 is a perspective view of a head part of a thermal printer during the heat transfer recording.

The ink sheet can be used in conventional thermal printers, for example, the printer shown in FIG. 9. The ink sheet 1 is set in a cassette 17 provided with a feed reel 15 and a winding reel 16, and the cassette 17 is inserted at a predetermined location on the printer, to position the ink sheet I between a thermal head 18 and a platen 19.

The printing is carried out as follows.

Figure 7:
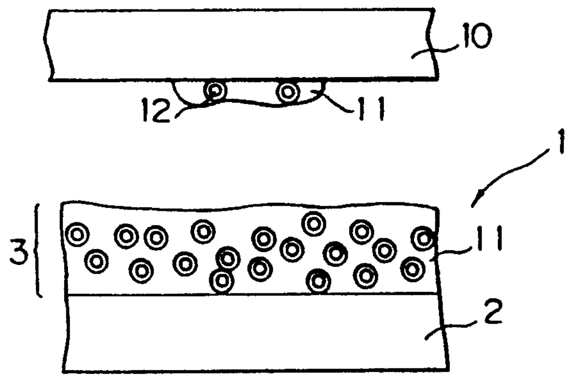
FIG. 7 is a cross-sectional view of the ink sheet of FIG. 6 showing the state of the ink layer after the sheet is once used.

The thermal head 18 is brought into contact with the ink sheet 1, to apply heat from the head 18 to a substrate of the sheet 1. As a result of this application of heat, a low-melting compound is first melted and then at least one dye and/or pigment is melted into a melt of the low-melting compound. Next, a EVA resin coating is melted, and as a result, a core-shell structure of the fine powders and EVA resin coating is destroyed. Since the melted EVA resin forms a viscous product having an appropriate viscosity, adhesivity and permeability together with other components of the ink, the viscous product is transferred to a recording medium such as printing paper. The result of the first printing using the ink sheet of FIG. 6 is shown in FIG. 7. As shown in FIG. 7, a print surface of the printing paper 10 holds the transferred ink, which consists of the ink 11 and the EVA-coated fine powders 12, and a surface of the ink layer 3 has no remarkable depressions and convexes.

Figure 8:
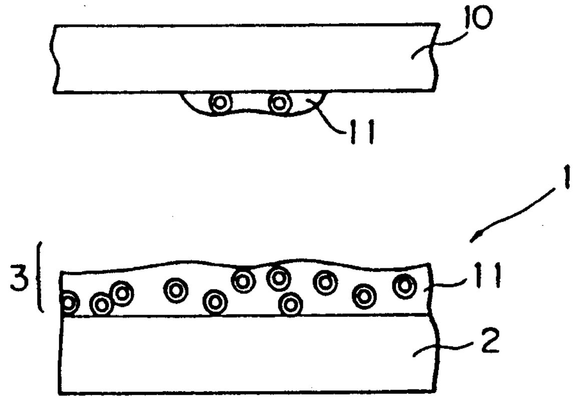
FIG. 8 is a cross-sectional view of the ink sheet of FIG. 6 showing the state of the ink layer after the sheet has been used several times.

After the repeated printing, as shown in FIG. 8, a layer thickness of the ink layer 3 is reduced, but the transfer of the molten ink is made as in the first printing. Note, a minor amount of the EVA-coated fine powders are transferred together with other ink components to the printing paper, in contrast to the prior art method in which the fine powders are fixedly retained in the ink layer of the ink sheet, and therefore, an amount of ink transferred ink per printing is increased, and thus the density, sharpness and fixing of the prints are significantly improved. Note, assuming that the density is constantly maintained, the number of the repetitions of use of the ink sheet will be increased.

Figure 10:
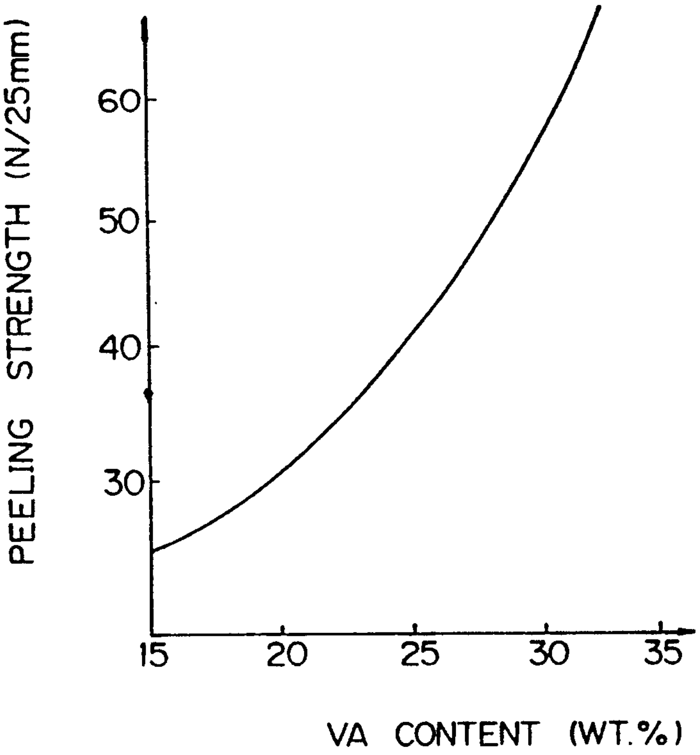
FIG. 10 is a graph showing a dependency of the peeling strength on the vinyl acetate (VA) content of the copolymer.

The above mechanism of the heat transfer of the ink will be further described with reference to FIGS. 10 and 11.

In the ink sheet of the present invention, a vinyl acetate content in the ethylene/vinyl acetate copolymer coated over the fine powders is in the range of from 18 to 45% by weight of the copolymer. This range of the vinyl acetate (VA) content means that the ethylene/vinyl acetate copolymer (EVA) has a melting point of about 45° to 130° C., which is approximately equivalent to a melting point of the low-melting compound. Namely, as described above, the EVA itself is also able to be melted upon exposure to heat from the printing head. Portions of the melted EVA with the fine powders are transferred to the printing paper.

Further, the transferred EVA effectively improves an adhesion of the transferred ink to the paper and thus improves the fixing of the ink to the paper. These improvements are easily understood from the graph of FIG. 10 showing a dependency of the peeling strength on the VA content. The peeling strength was determined by sandwiching a predetermined amount of EVA having different VA contents between a pair of aluminum plates and then separating the plates. A good peeling strength was obtained from the EVA of the present invention, which contains 18 to 45% by weight of the VA unit. Note, an excessively low peeling strength does not provide a good fixing of the ink to the paper, and an excessively high peeling strength provides in an inseparatable bonding of the ink sheet and the paper.

Figure 11:
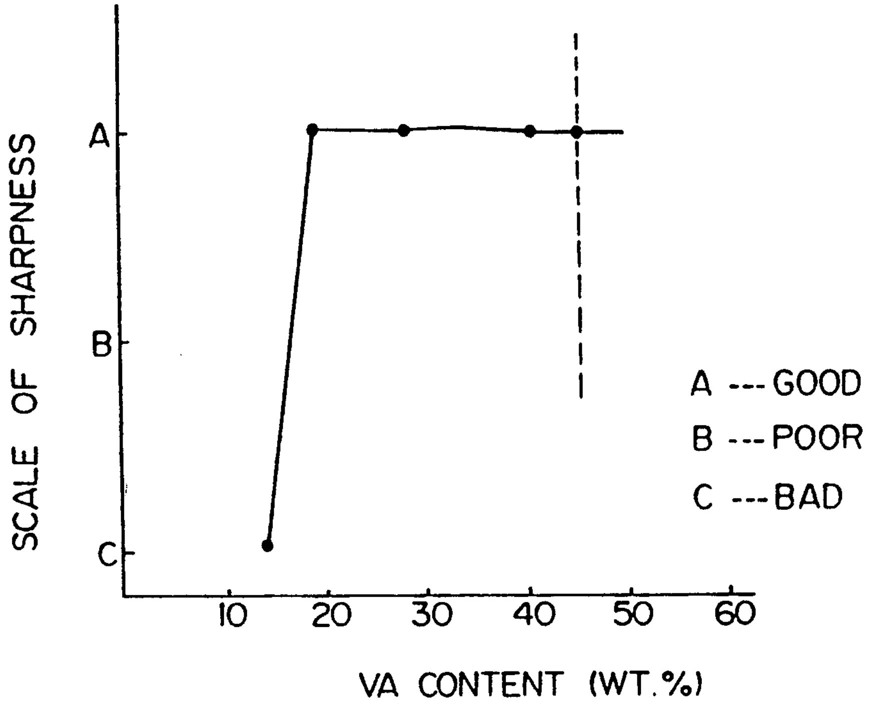
FIG. 11 is a graph showing a dependency of the sharpness of the prints on the VA content.

Furthermore, in connection of the above improvements, the transferred EVA effectively improve the sharpness of the resulting prints (see, FIG. 11 in which the sharpness is classified into three levels A, B and C). As can be seen from FIG. 11, an excellent sharpness can be obtained when the VA content in the EVA is 18 to 45% by weight. Note, a VA content of more than 45% by weight will provide an excellent sharpness, but as described above with reference to FIG. 10, will cause an inseparable bonding of the ink sheet and paper.

Furthermore, the molecular weight of the EVA of 30,000 or less is important, as such a molecular weight effectively provides a fluidity suitable for a transfer to the molten EVA, when the ink is melted by heating. The molten EVA shows a fluidity (M.F.R.) of 10 dg/min or more determined i-n accordance with ASTM D-1238. A molecular weight of more than 30,000 will provide a poor fixing of the ink, due to a lowered fluidability and increased viscosity of the ink. The lower limit of the EVA is not critical, but is preferably about 3,000.

In the practice of the present invention, any material may be used as the substrate as long as it can withstand the heat of thermal printing heads or the like. Namely, any conventional material which does not soften, melt, or deform upon heating with the heating means may be used. Preferred materials suitable as the substrate include polyester film, polyamide film, polyimide film, polycarbonate film, and other polymeric films, glassine paper, condenser paper, and other thin paper, and aluminum foil and other metal foils or sheets. Alternatively, the substrate may be a composite comprising two or more adhered layers of the substrate materials. Preferably, the the thickness of the substrate is from 3 to 25 82 m.

The ink layer formed on the substrate comprises, as described above, at least one dye and/or pigment as a colorant, a low-melting compound as a vehicle and EVA-coated fine powders. The dye and/or pigment used as the colorant may be any dye and pigment used in the art. Suitable dyes include, for example, anthraquinone dyes such as Sumikalon Violet RS (product of Sumitomo Chemical Co., Ltd.), Dianix Fast Violet 3R-FS (product of Mitsubishi Chemical Industries, Ltd.), and Kayalon Polyol Brilliant Blue N-BGM and KST Black 146 (products of Nippon Kayaku Co., Ltd.); azo dyes such a Kayalon Polyol Brilliant Blue BM, Kayalon Polyol Dark Blue 2BM, and Kayaset Black KR (products of Nippon Kayaku Co., Ltd.), Sumikalon Diazo Black 5G (product of Sumitomo Chemical Co., Ltd.), and Miktazol Black 5GH (product of Mitsui Toatsu Chemicals, Inc.); direct dyes such as Direct Dark Green B (product of Mitsubishi Chemical Industries, Ltd.) and Direct Brown M and Direct Fast Black D (products of Nippon Kayaku Co., Ltd.); acid dyes such as Kayanol Milling Cyanine 5R (product of Nippon Kayaku Co., Ltd.); and basic dyes such as Sumieaeryl Blue 6G (product of Sumitomo Chemical Co., Ltd.) and Aizen Malachite Green (product of Hodogaya Chemical Co., Ltd.); as well as other dyes such as triphenyl methane dyes, diphenylmethane dyes, xanthene dyes, acridine dyes and quinone imine dyes, for example, nigrosine dye. Suitable pigments include organic pigments such as carbon black, graphite, phthalocyanine pigments, for example, phthalocyanine Blue, insoluble azo pigments, dioxazine pigments, and quinacridone pigments; and inorganic pigments such as iron blue, ultramarine blue, titanium yellow, titanium black, iron oxide red, chrome yellow, lead sulfide, titanium oxide, zinc sulfide, barium sulfate, and cadmium sulfide. These dyes and pigments may be used alone or in combination, and are preferably used in an amount of about 4 to 50% by weight of the total amount of the ink. Further, any organic solvent conventionally used as a dye solvent may be optionally used to dissolve the dyes or pigments. Suitable organic solvents include ethyl alcohol, toluene, isopropyl alcohol, and acetone.

A low-melting compound as the vehicle is used to form as ink. The low-melting compound preferably has a melting point of about 45° to 130° C., and suitable low-melting compounds include, for example, naturally occurring substances such as mineral waxes, for example, montan wax or sericine wax, vegetable waxes, for example, carnauba wax, Japan wax, candelilla wax or rice wax, animal waxes, for example, beeswax or lanolin, and petroleum waxes such as paraffin wax or microcrystalline wax; and synthetic substances such as aliphatic acid amides, for example, stearic amide, palmitic amide, oleic amide, erucic amide, N-stearyl oleic amide, ricinoleic amide, linolic amide, linolenic amide or erucinic amide, aliphatic acid esters, for example, glycerol monostearate, sorbitan monobehenate, stearyl behenate, stearyl stearate, cane sugar aliphatic acid ester, lariolin aliphatic acid sorbitan ester or lanolin aliphatic acid polyglycerol ester, metal salts of aliphatic acid for example, calcium stearate, zinc stearate or magnesium stearate, aliphatic acid such as stearic acid, palmitic acid, oleic acid or erucic acid, low molecular weight polyethylene, oxidized low molecular weight polyethylene, and low molecular weight urethane, for example, condensation products of hexamethylene diisocyanate and alcohol or condensation products of octadecylmonoisocyanate and alcohol. These low-melting compounds may be used alone or in combination, and preferably, are used in an amount of about 5 to 80% by weight of the total amount of the ink.

The ink layer is formed from an ink composition prepared by blending the above-described colorant and vehicle, and optionally other additives, together with the EVA-coated fine powders. The EVA-coated fine powders has a "core-shell" structure, but the form and the thickness of the shell or EVA coating are not restricted. Generally, the EVA-coated fine powders are spherical bodies or similar and preferably have a particle size of 0.01 to 200 μm, more preferably 0.02 μm to 50 μm. If the particle size is less than 0.01 μm, a desired spongy structure is not obtained, and if the particle size is more than 200 μm, the obtained printing quality and other properties are poor.

A variety of fine powders of the solid inorganic or organic materials can be used as a core of the EVA-coated fine powders. Suitable fine powders include, for example:

- metal oxides such as zinc oxide, alumina, titanium oxide, tin oxide, $Fe_2O_3$, $\gamma$-$Fe_2O_3$, $Fe_3O_4$ or Co-$\gamma$-$Fe_3O_4$;
- metal carbonates such as calcium carbonate, magnesium carbonate or barium carbonate;
- metal sulfates such as barium sulfate;
- metals including foils such as copper, silver, aluminum, tin, iron, nickel or cobalt;
- naturally occurring inorganic powders such as kaolin, clay, activated clay, talc, diatomaceous earth or molecular sieve;
- synthetic inorganic powders such as zeolite, white carbon, silica or aluminum silicate;
- organic powders such as carbon black, graphite, phthalocyanine pigments, insoluble azo pigments, dioxazine pigments, quinacridone pigments or fine powders of thermosetting resins, for example, epoxy resins, phenolic resins or urea-melamine resins; and
- inorganic pigments such as iron blue, ultramarine blue, chrome yellow, titanium yellow, titanium black, iron oxide red, lead oxide or white lead.

Note, as previously described, some of the abovelisted fine powders may be UBed as the colorant in the preparation of the ink itself, if desired. Further, these fine powders may be used alone or in combination. Furthermore, to further improve the effects of the present invention, it is contemplated the fine powders having a hue similar to the simultaneously used colorant may be used, to thereby increase the density of the resulting prints as a result of an increase of the color density of the transferred ink.

Similarly, a variety of the EVA copolymers or resins can be used as a shell of the EVA-coated fine powders, but as previously described, they must have a number average molecular weight of 30,000 or less and must contain a vinyl acetate unit in an amount of 18 to 45% by weight of the copolymer.

As previously described with reference to FIGS. 10 and 11, the VA content of 18 to 45% by weight is important to the performance of the ink sheet according to the present invention. In addition to the described performance, the ink sheet provides advantages such that the transferred ink is uniformly and sharply transferred onto a rough surface of the printing paper due to a good adhesion and fluidity of the ink, and that an adhesive interlayer is omitted from the interface between the substrate and the ink layer due to a significantly increased adhesive property of the EVA-containing ink layer. The omission of the interlayer bring advantages such that the production process is simplified, the production cost is lowered, and the printing sensitivity is improved as a function of the improved thermal efficiency based on the reduced thickness of the ink sheet. Of course, if desired, an interlayer may be inserted between the substrate and the ink layer.

The EVA copolymers are generally used solely in the production of the ink, but may be used as a combination of the ethylene/vinyl acetate having a number average molecular weight of 30,000 or less and containing a vinyl acetate unit of 18 to 26% by weight of the copolymer and that having a number average molecular weight of 30,000 or less and containing a vinyl acetate unit of 27 to 45% by weight of the copolymer. Namely:

The combined use of these two types of the EVA copolymers is particularly effective when obtaining a transfer of the ink and a peeling of the ink sheet, without drawbacks, for a solid black printing, and is of course effective when the printing usual characters and symbols. As is well-known, solid black printing is used in the field of graphic art and the like.

The prior art solid black printing is carried out in such a way that the printing energy applied to the ink sheet is reduced, with time, because the prior art ink sheet is a single use or "one time" ink sheet. Nevertheless, such a gradual reduction of the applied energy cannot be utilized for the multitime ink sheet, due to a relatively large thickness of that ink sheet and a low sensitivity thereof to the energy. Further, for the multitime ink sheet, when the applied printing energy is low, the ink transfer is poor, or an inseparable adhesion of the ink sheet to the printing paper occurs. These drawbacks do not arise in the multitime ink sheet of the present invention.

Figure 20:
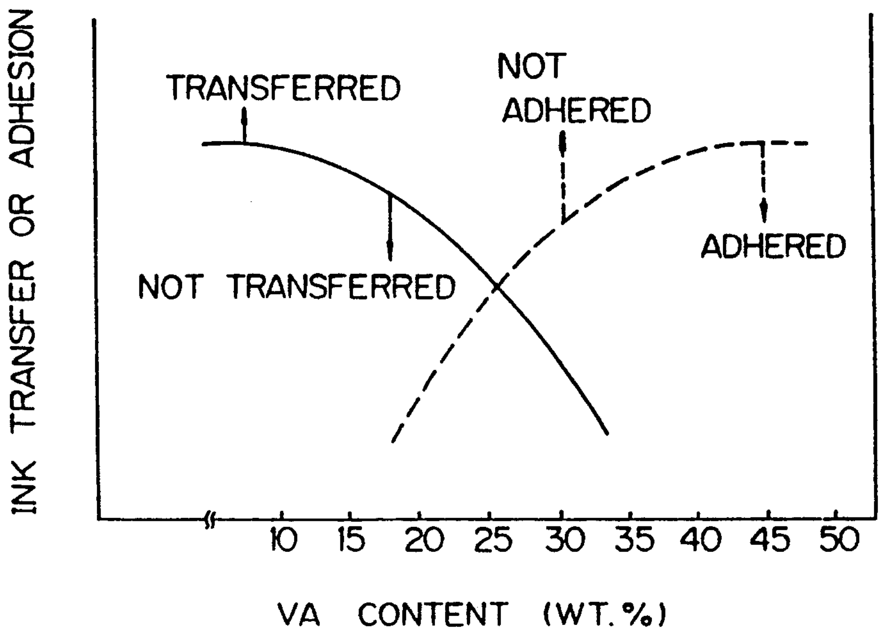
FIG. 20 is a graph showing a dependency of the ink transfer and adhesion on the VA content.

More particularly, the reason why the above-described combined use of the EVA copolymers is effective for solid black printing will be appreciated from the graph of FIG. 20, showing a dependency of the ink transfer and adhesion on the VA content. As can be seen from FIG. 20, at a relatively low VA content, the ink is not transferred to the printing paper, and this is reversed with an increase of the VA content (see, the solid line). Similarly, at a relatively low VA content, an adhesion of the ink sheet to the printing paper does not substantially occur, but this adhesion is increased with an increase of the VA content (see dotted line). Note, the ink sheet adhesion to the printing paper at a low printing energy is based on the solidification of the ink before the separation of the paper from the sheet due to a high viscosity of the ink and this as well as the above ink transfer depends upon the VA content in the EVA copolymer.

Thus, to obtain an ink also suitable for the solid black printing and able to carry out a normal ink transfer and sheet separation for such a printing, as initially described, the EVA having a VA content of 26% by weight, i.e., cross point of the solid line and dotted line in FIG. 20, or less, should be mixed with a EVA having the VA content of 26% by weight or more.

Preferably, the EVA copolymer is coated on the fine powders in an amount of 5 to 70% by weight with respect to the total amount of the ink. If the EVA is less than 5% by weight, it will not completely cover the surface of each fine powder, and to thereby form an intended spongy structure, and the uncoated fine powders will cause a poor use repeatability of the ink sheet. Similarly, the EVA must not be above 70% by weight because instead of the intended spongy structure, a tough structure not suitable for the migration of the ink in the layer is obtained.

Preferably, the fine powders are used in an amount of 3 to 50% by weight with respect to the total amount of the ink. When the amount of the fine powders is less than 3% by weight, the above-described spongy structure is not obtained, and thus a thickness of the ink layer is wholly transferred to the printing paper after the only one use of the ink sheet, i.e. a repeated use of the ink sheet impossible. When the amount of the fine powders is more than 50% by weight, an excessively hard and tough structure which inhibits the migration of the ink is obtained, as a result, an excessively reduced print density is obtained.

The above-described colorant, vehicle, EVA-coated fine powders and optional additives are coated onto a surface of the substrate to form an ink layer. The thickness of the ink layer can be widely varied depending upon different factors such as the use of the ink sheet, type of printing paper or the like, but preferably the thickness of the ink layer is from 2 to 20 μm (dry thickness). When the thickness is less than 20 μm, the ink sheet shows a remarkably decreased capability for repeated use. On the other hand, when the thickness is more than 200 μm, it is difficult to attain a satisfactory heat transfer effect under conventional heating conditions such as by the use of a thermal printing head. Further, the unsatisfactory heat transfer effect would result in a recognizable decrease of the density of the prints.

In addition to the colorant and the low-melting compound, the ink may contain any additives which further improve the properties of the resulting ink sheets.

One additive useful in the ink of the present invention is a plasticizer. When incorporated, the plasticizer improves a print density of the ink sheet at a low temperature below room temperature (about 20° C.), although a satisfactory print density can be of course, obtained for the same ink sheet at an elevated temperature of 2020 C. or more.

Figure 17A:
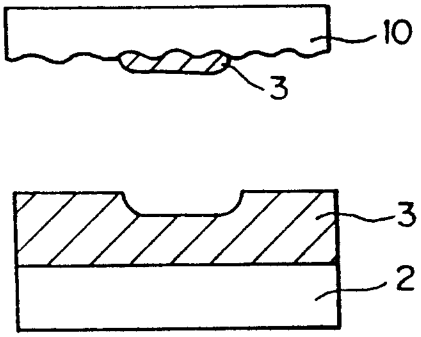
FIG. 17A is a cross-sectional view showing the result of the printing at a room temperature.
Figure 17B:
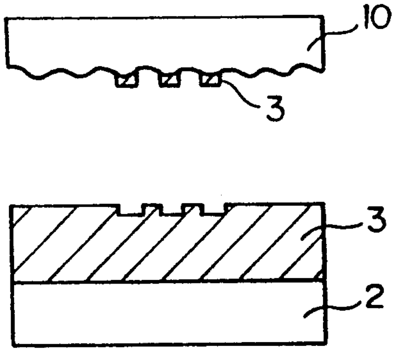
FIG. 17B is a cross-sectional view showing the result of the printing at a low temperature.

The differences in the print density of the ink sheet at the room temperature and lower temperature will be seen from FIGS. 17A and 17B. Namely, as shown in FIG. 17A, a satisfactory ink transfer is obtained for the room temperature of 20° C. FIG. 17A clearly shows that a part of the ink was uniformly transferred from the ink layer 3 on the substrate 2 to the printing paper. In contrast, when the printing was made under the same conditions except that the temperature was lowered to 10° C., a satisfactory printing was not obtained (see, FIG. 17B). Since the sensitivity of the ink to the heat is reduced when the temperature falls, the ink 3 is nonuniformly transferred to the printing paper 10 as shown in FIG. 17B and as a result, a poor print density is obtained. This inadequate printing is particularly remarkable in the printing of lengthwise ruled lines and similar characters, because such lines and characters are susceptible to the sensitivity of the ink and are brokenly printed on the paper, and for the printing of such lines and characters onto the roughened surface of the printing paper. Unexpectedly, however, this drawback in the low temperature printing is removed by incorporating a plasticizer into the ink according to the present invention, whereby the satisfactory ink transfer equivalent to that of FIG. 17A is obtained upon low temperature printing.

The effects of the plasticizer are considered to be due to the following causes, as shown by the results of the appended working examples. Namely, the addition of the plasticizer to the ink reduces a glass transition temperature, and thus a melting point of the EVA in the ink, and thus the EVA becomes meltable by a low energy. In addition, the ink can easily migrate onto the rough surface of the ink sheet, since a melt viscosity of the polymeric substances in the ink is reduced.

A wide variety of plasticizers can be used in the present invention, and typical examples thereof include:

phosphoric esters such as (1) trioctyl phosphate, (2) triethyl phosphate, (3) tricresyl phosphate, (4) tributyl phosphate, (5) trichloroethyl phosphate, (6) trisdichloropropyl phosphate, (7) tributoxyethyl phosphate, (8) tris(β-chloropropyl) phosphate, (9) triphenyl phosphate, (10) octyldiphenyl phosphate, (11) trisisopropylphenyl phosphate or (12) cresyldiphenyl phosphate;

phthalic esters such as (13) dimethyl phthalate, (14) diethyl phthalate, (15) dibutyl phthalate, (16) diheptyl phthalate, (17) dioctyl phthalate, (18) diisononyl phthalate, (19) di-2-ethylhexyl phthalate, (20) octadecyl phthalate, (21) diisodecyl phthalate or (22) butylbenzyl phthalate;

aliphatic dibasic acid esters such as (23) dioctyl adipate, (24) diisononyl adipate, (25) diisod ecyl adipate, (26) dialkyl adipate, (27) dibutyldiglycol adipate, (28) dioctyl azelate, (29) dibutyl sebacate or (30) dioctyl sebacate;

oxyacid esters such as (31) acetyltriethyl citrate, (32) acetyltributyl citrate, (33) methyl acetylricinolate or (34) butylphthalyl butylglycolate;

maleic fumaric esters such as (35) dibutyl maleate, (36) d-2-ethylhexyl maleate, (37) dibutyl fumarate or (38) dioctyl fumarate;

aliphatic monobasic acid esters such as (39) butyl oleate or (40) glycerol monooleic acid ester;

dihydric alcohol esters such as (41) diethyleneglycol benzoate or (42) triethyleneglycol di-2-ethylbutyrate; and other plasticizers such as (43) chlorinated paraffin, (44) N-ethyltoluene sulfonamide, (45) toluene sulfonamide or (46) hydrogenated terphenyl.

Preferably, the content of the plasticizer is from 1 to 30% by weight with respect to the total amount of the ink. The effect of the plasticizer addition is not obtained, if the plasticizer is added to the ink, in an amount of less than 1% by weight, and, an amount of more than 30% by weight causes an smearing of the printing paper during the printing and an offsetting of the printed ink to an adjacent printing sheet when the printed papers are stacked.

Another additive useful in the ink of the present invention is a light stabilizer. A light stabilizer such as ultraviolet (UV) absorber or UV stabilizer can provide an extended shelf life of the ink without a deterioration of the excellent performances thereof, particularly in a high temperature atmosphere, while the maintenaining of the excellent quality of the print.

As is well-known in the art, prior art ink sheets and ink ribbons for the thermal transfer printing are unstable in an atmosphere of 40° C. and higher and therefore, when left to stand in such a high temperature atmosphere, a reduction of the print density or a smearing on the waxy substances in the surface of the ink sheet occur.

Figure 21:
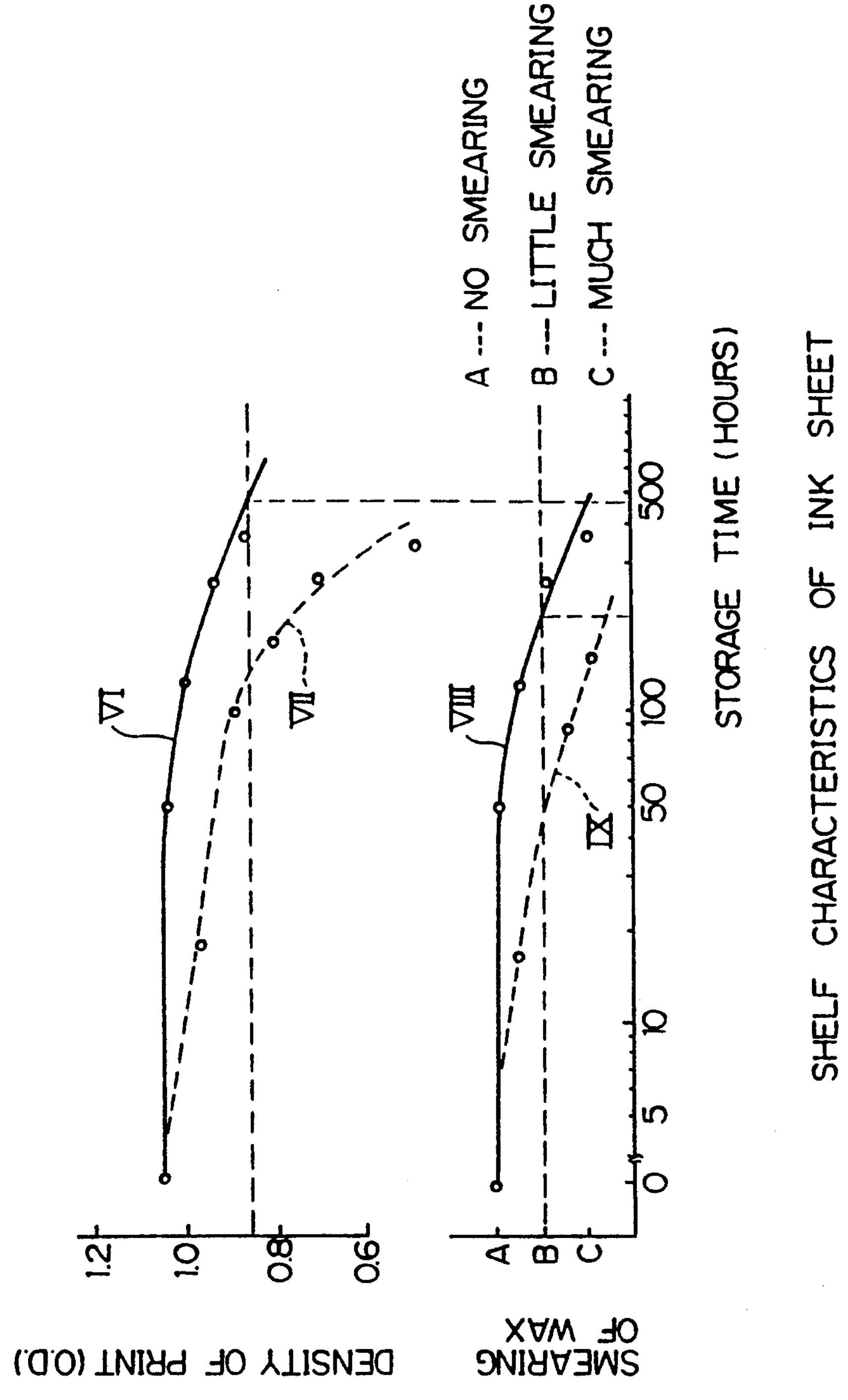
FIG. 21 is a graph showing shelf characteristics of the ink sheet.

The unavoidable deterioration of the performances in the prior art ink sheets is shown by FIG. 21, in which the two dotted lines VII and IX represent the prior art sheet. The tested ink sheet was prepared and tested as follows:

The ink having the composition:

| ink components | parts by weight |
|---|---|
| carbon black | 20 |
| aniline black | 10 |
| carnauba wax | 20 |
| EVA resin | 20 |
| antioxidant | 5 |

was mixed at 120° C. for 3 hours and the mixture was hot melt coated at a dry thickness of about 10 μm onto a polyester film. The resulting ink sheet was left to stand in a high temperature atmosphere of 60° C. and 10% R.H., and then used for PPC thermal printing in a thermal printer of a word processor commercially available under the tradename OASYSLITE 30AF III from Fujitsu Limited. The printing was made in the atmosphere of 25° C. and 50% R.H, and the results plotted in FIG. 21 were obtained. Namely, as shown in an upper graph of FIG. 21, a print density or O.D. (optical reflection density) was rapidly lowered with a lengthening of the storage time, and reached a critical point or lower limit of the acceptable print density of 0.86 after the storage for about 115 hours (see, line VII). In addition, as shown in a lower graph of FIG. 21, a slight smearing of the wax on the surface of the ink sheet was occurred after the ink sheet was left to stand for about 50 hours (see, line IX).

The above-described drawbacks of the prior art ink sheets are avoided by incorporating a light stabilizer into the ink according to the present invention. The light stabilizer including the uv absorber, uv stabilizer and other stabilizers inhibit undesirable deterioration of the properties of the ink components, for example, modification or deterioration of the properties of the ink component upon exposure to light, particularly, UV light, or provides an improved thermal transfer ink sheet having an extended shelf life and a lower deterioration of the properties during long time storage.

A variety of light stabilizers, which are well-known in the art, can be used in the practice of the present invention, and typical examples thereof include:

salicylic acid-based uv absorbers such as (1) phenyl salicylate, (2) p-tert.-butylphenyl slicylate or (3) p-octylphenyl salicylate;

benzophenone-based Uv absorbers such as (4) 2,4-hydroxy-benzophenone, (5) 2-hydroxy-4-methoxy-benzophenone, (6) 2-hydroxy-4-octhoxybenzophenone, (7) 2-hydroxy-4-dodecyloxybenzophenone, (8) 2,2'-dihydroxy-4-methoxybenzophenone, (9) 2,2'-dihydroxy-4,4'-dimethoxybenzophenone or (10) 2-hydroxy-4-methoxy-5-sulfobenzophenone;

cyanoacrylate-based UV absorbers such as (11) 2-ethylhexyl-2-cyano-3,3'-diphenylacrylate or (12) ethyl-2-cyano-3,3'-diphenylacrylate; and UV stabilizers such as (13) nickel bis(octylphenyl)sulfide, (14) nickel dibutyldithiocarbamate, (15) benzoate-type quencher or (16) hindered amine.

The content of the above-listed and other light stabilizers preferably from 0.1 to 15% by weight with respect to the total amount of the invention. A higher content of, the plasticizer will result in a rapid reduction of the print density or optical reflection density of the prints.

The above-described ink sheets of the present invention can be produced according to the process of the present invention as described hereinafter, whereby a dispersed coating solution suitable for the formation of a porous spongy structure of the ink layer can be produced, and accordingly, a uniform and thin ink layer can be easily formed on the substrate. The process for the production of the ink sheets according to the present invention includes (1) a hot melt dispersion/hot melt coating method, (2) a solvent dispersion/solvent coating method, and (3) a hot melt dispersion/solvent coating method. Among these three methods, the hot melt dispersion/solvent coating method is most preferable.

According to the present process, two starting materials, i.e., EVA-coated fine powders and a mixture of the colorant and vehicle are preferably prepared separately and mixed before the coating of the resulting mixture onto the substrate.

Figure 12:
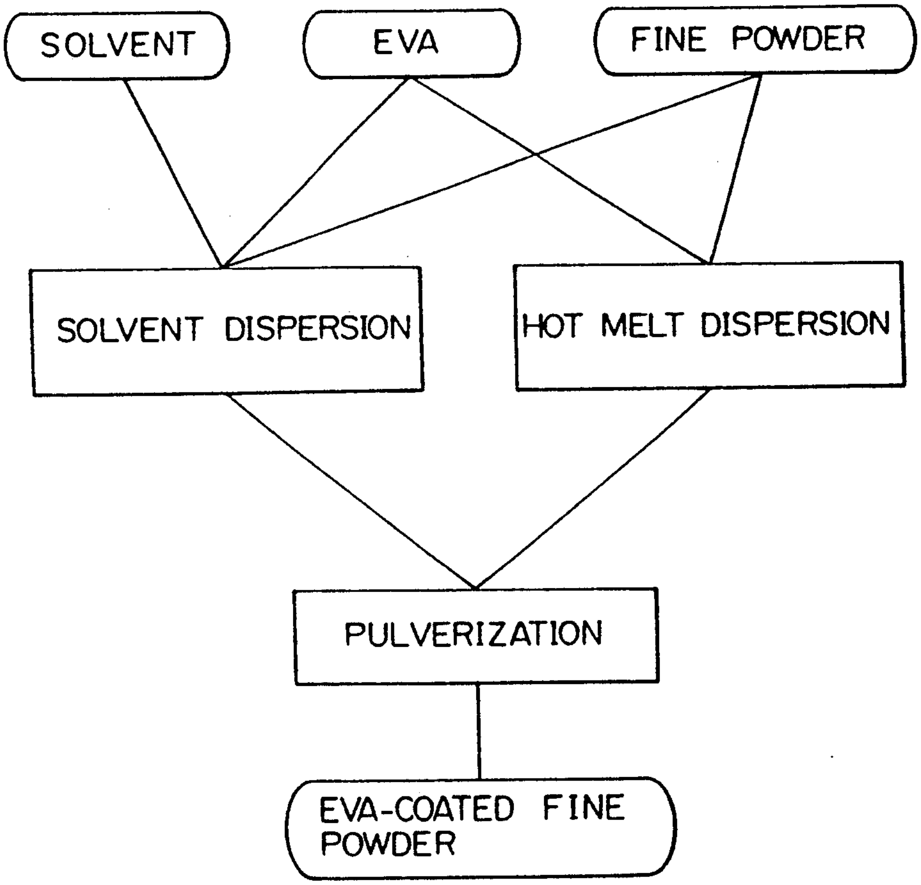
FIG. 12 is a flow sheet showing the production of the ethylene/vinyl acetate (EVA)-coated fine powders in accordance with the present invention.

First, the EVA-coated fine powders preferably are prepared in accordance with the two routes shown in FIG. 12. Preferably, the EVA-coated fine powders are prepared by blending the uncoated fine powders and EVA in accordance with a hot melt dispersion process or by dispersing the uncoated fine powders and EVA in a solvent in accordance by a solvent dispersion method, and then pulverizing the blend or dispersion. Note, hot melt dispersion is a method of dispersing the hot melt of the starting components in the absence of a solvent, and therefore the components will be finely dispersed in a molecular state thereof. In contrast, solvent dispersion is a method of dispersing the starting components in a solvent, and therefore, the components will be dispersed in a particle state.

Figure 13:
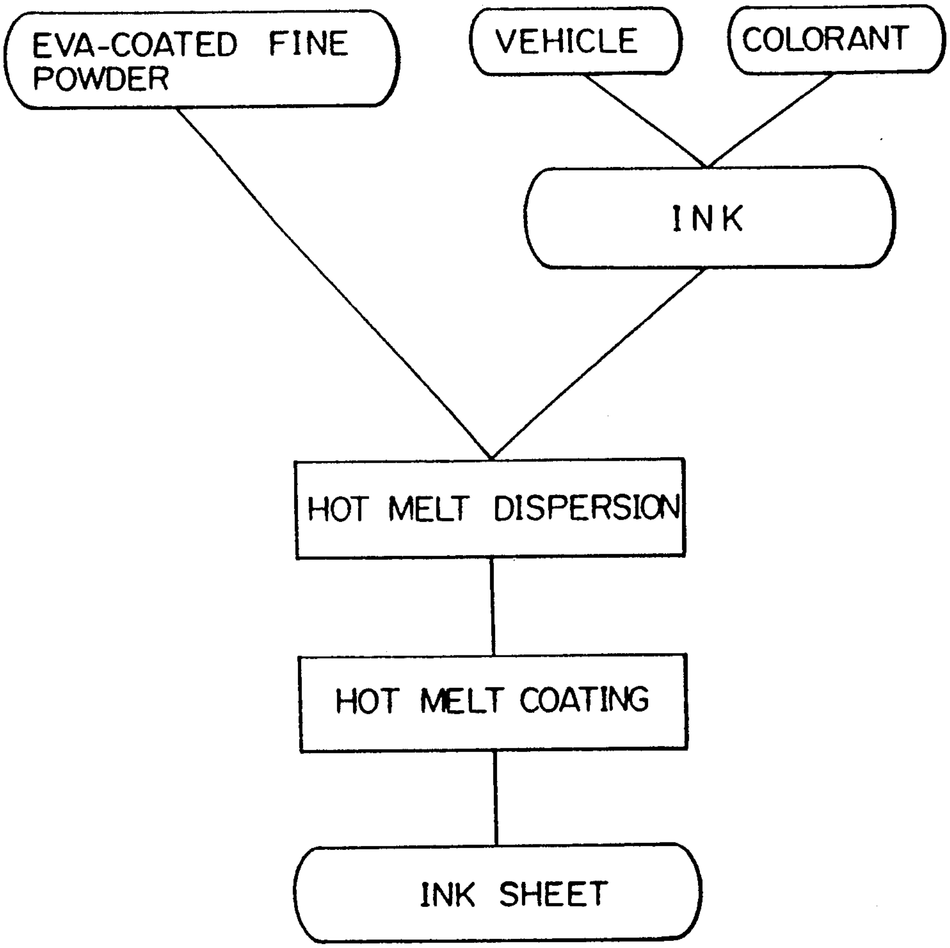
FIG. 13 is a flow sheet showing the production of the ink sheet according to the present invention.
Figure 14:
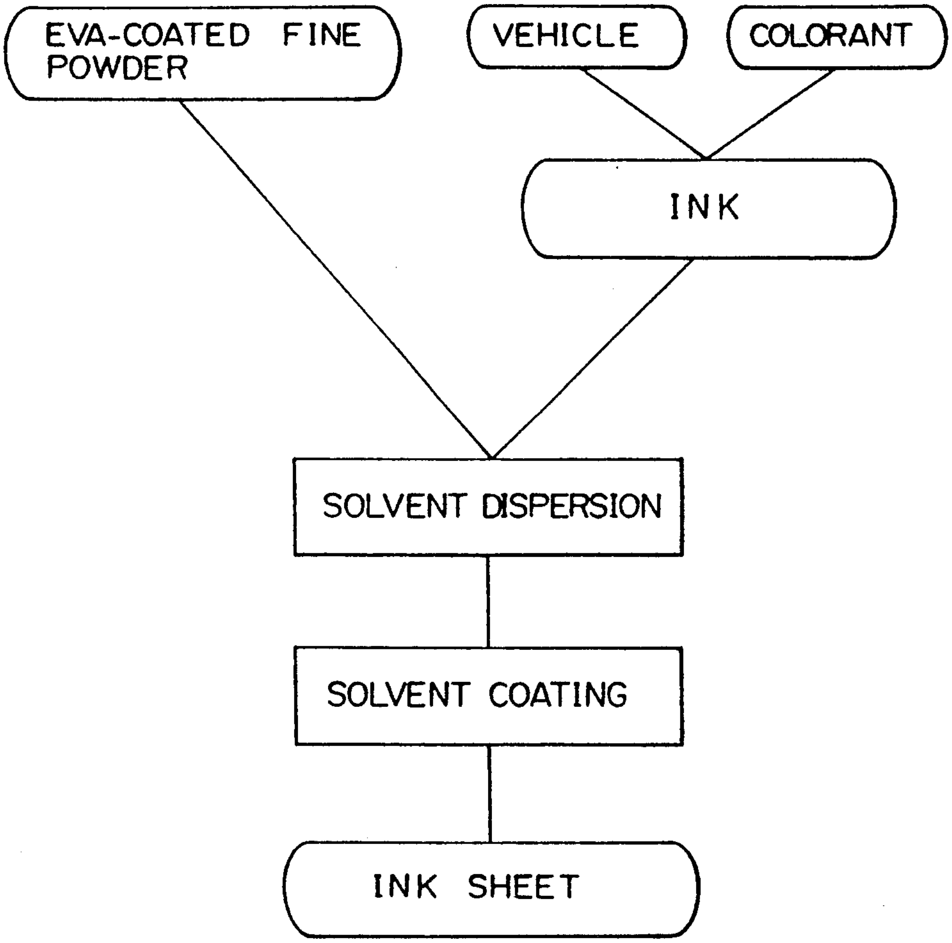
FIG. 14 is also a flow sheet showing the production of the ink sheet according to the present invention.

After the formation of each of the EVA-coated fine powders and a mixture of the colorant and vehicle, preferably, they are blended by a hot melt dispersion method and the dispersion is coated on the substrate surface by a hot melt coating method to form an ink sheet (see, FIG. 13). Alternatively, they are blended by a solvent dispersion method and the dispersion is coated on the substrate surface by a solvent coating method to form an ink sheet (see, FIG. 14).

Figure 15:
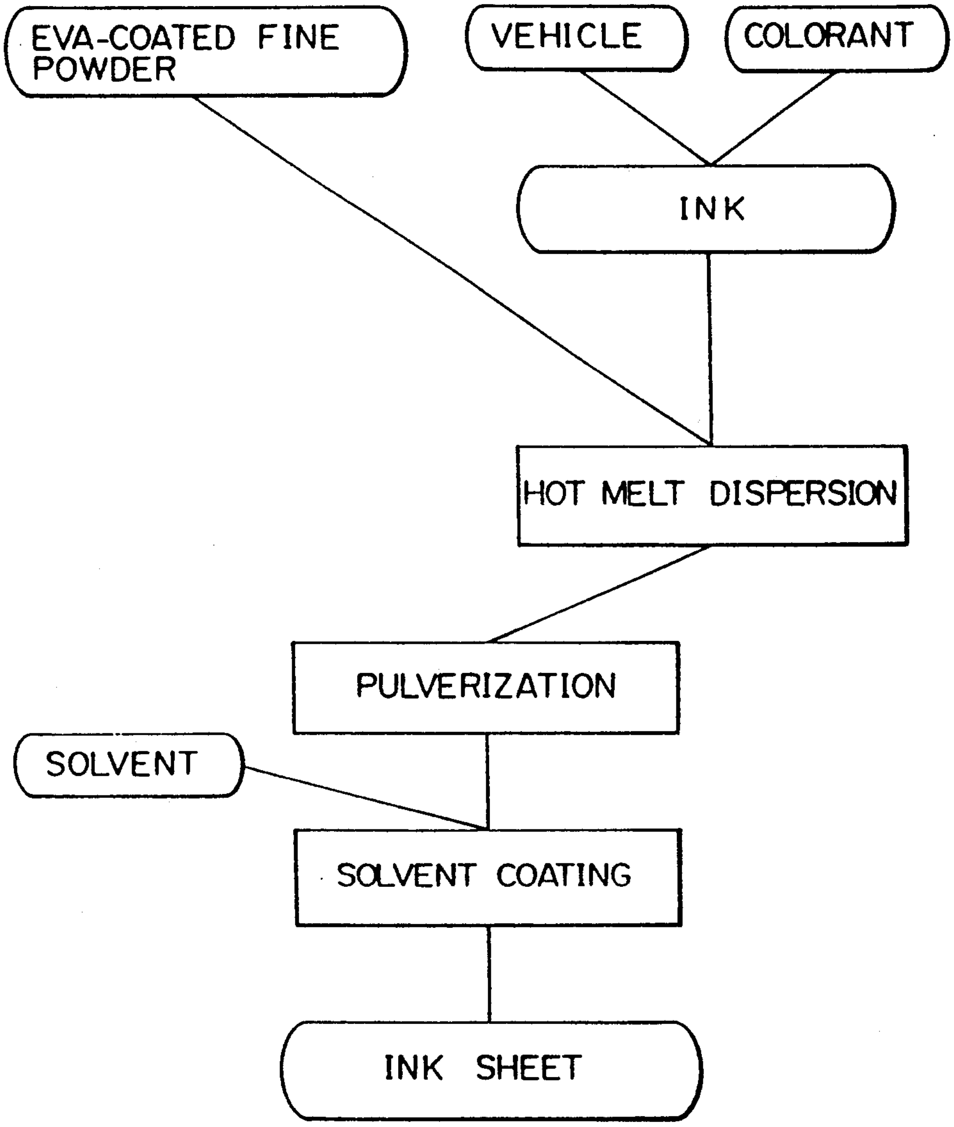
FIG. 15 is also a flow sheet showing the production of the ink sheet according to the present invention.

Most preferably, the EVA-coated fine powders and the mixture of the colorant and vehicle are blended by a hot melt dispersion method, the dispersion is pulverized, and the resulting powders are coated on the substrate surface by a solvent coating method, to form an ink sheet (see, FIG. 15).

In the production of the ink sheets by the hot melt dispersion/solvent coating method, no solvent is used when mixing the EVA-coated fine powders with the starting ink or the mixture of the colorant and vehicle, and heating is applied to melt and blend these ink components. In this hot melt dispersion, the low-melting compounds as the vehicle such as higher fatty acid esters, which can be melted to become a liquid upon heating can act as a dispersing medium, and the dye and/or pigment as the colorant and the EVA-coated fine powders can act as a disperse phase. The colorant may be either soluble or insoluble in the vehicle, but the EVA coating for the fine powders is in soluble in the vehicle.

During the hot melt dispersion, a shifting stress is applied to the disperse phase to thereby produce a finely dispersed melt of the fine powders and the starting ink, and the resulting suspension is cooled and solidified to make a solid colloid. Before coating, the solid colloid is pulverized and dispersed in a solvent as a dispersing medium to make a coating solution. A viscosity of the coating solution is controlled by changing an amount at the dispersing medium used. The coating solution is coated on a surface of the substrate by conventional coating methods such as roll coating, bar coating or doctor blade coating. An ink sheet having a uniform and thin ink sheet consisting of homogeneously dispersed fine powders and ink components is thus obtained.

The present invention will be further described with reference to working examples thereof and comparative examples. Note, it should be understood that the present invention is not restricted by these examples.

EXAMPLE 1

First. 20 parts by weight of carbon black ("Seast 3M" commercially available from Tokai Carbon KK) and 20 parts by weight of ethylene/vinyl acetate (EVA) copolymer ("Evaflex 250" commercially available from. Mitsui DuPont Chemical KK; VA content=28% by weight, MFR=15) were blended at 120° C. for 2 hours in a roll mill to prepare EVA-coated fine powders of carbon black. An electron microscopic examination of the carbon black powders showed that each powder contained an EVA coating fully applied on a surface of the powder.

Thereafter, 10 parts by weight of oil black dye ("Aizen Sot Black 3" commercially available from Hodogaya Kagaku Kogyo KK), 30 parts by weight of carnauba wax (commercially available from Nikko Fine Chemical KK), and 20 parts by weight of montan wax (commercially available from Nikko Fine Chemical KK) were kneaded at 100° C. for one hour in a roll mill, and further kneaded for 30 minutes after the addition of the previously prepared EVA-coated carbon black powders. The thus-prepared ink composition was hot melt-coated a thickness of 10 μm on a surface of the polyester film having a thickness of 6 μm. The resulting ink sheet had the structure shown in FIG. 6.

The printing test was made by the thermal printer of FIG. 9 and in accordance with the described procedure, and satisfactory printing results similar to those of FIGS. 7 and 8 were obtained after repeated use of the ink sheet. Namely, each print had a good print density, sharpness and ink fixing (see Table 3).

EXAMPLES 2 AND 3

The procedure of Example 1 was repeated except that the composition of the ink components was changed as shown in the following Table 1. Similar satisfactory results were obtained (see Table 3).

TABLE 1

| Ink components | Example 2 | Example 3 |
|---|---|---|
| carbon black | 45 | 5 |
| EVA | 7 | 65 |
| oil black | 8 | 15 |
| carnauba wax | 24 | 9 |
| montan wax | 16 | 6 |

Note:
The unit of the composition is parts by weight.

EXAMPLE 4

The procedure of Example 1 was repeated except that the ink sheet was produced as follows.

First, 20 parts by weight of carbon black ("Seast 3M"), 20 parts by weight of EVA ("Evaflex 40Y" commercially available from Mitsui DuPont Chemical KK; VA content =41% by weight, MFR=65, Molecular weight $\overline{M}n$=about 20,000) and 30 parts by weight of tetrahydrofuran were dispersed for 8-hours in a ball mill, and then spray dried while evaporating the tetrahydrofuran, whereby EVA-coated fine powders of carbon black were obtained. An electron microscopic examination of the carbon black powders showed that each powder contained a full EVA coating on a surface of the powder.

Thereafter, 10 parts by weight of carbon black pigment ("Tokablack #8500" commercially available from Tokai Carbon KK), 35 parts by weight of microcrystalline wax (commercially available from Nikko Fine Chemical KK), and 100 parts by weight of methylethylketone were dispersed for 2 hours in an attributer, and further dispersed after the addition of the previously prepared EVA-coated carbon black powders. The thus-prepared ink composition was hot melt-coated to a thickness of 10 82 m on a surface of the polyester film having a thickness of 6 μm and the resulting ink sheet had a structure of FIG. 6 described above.

The printing test was made on the thermal printer of FIG. 9 and in accordance with the described procedure, and satisfactory printing results were obtained (see Table 3).

EXAMPLE 5

The procedure of Example 1 was repeated except that the ink sheet was prepared in accordance with the following procedure.

First, 20 parts by weight of a diatomaceous earth ("Zeoharb" commercially available from Osaka Sanso KK), 15 parts by weight of EVA ("Evaflex 410" commercially available from Mitsui DuPont Chemical KK; VA content =19% by weight, MFR=400, Molecular weight $\overline{M}n$=about 14,000), and 200 parts by weight of 1,1,1-trichloroethane were dispersed in a sand mill and the 1,1,1-trichloroethane was evaporated off, whereby EVA-coated fine powders of the diatomaceous earth were obtained. The EVA-coated diatomaceous earth powders were then added with 20 parts by weight of phthalocyanine blue pigment (commercially available from Dainichi Seika KK) and 45 parts by weight of stearic acid amide ("Alflow S10" commercially available from Nippon Yushi KK), and further mixed with heating. The thus resulting ink composition was hot melt-coated to a thickness of 8 μm on a surface of the polyester film having a thickness of 6 μm, and the resulting ink sheet had the structure shown in FIG. 6.

The printing test was made by the thermal printer of FIG. 9, in accordance with the described procedure, and satisfactory printing results were obtained (see Table 3).

COMPARATIVE EXAMPLES

To ascertain the effects of the present invention, the following comparative experiments (Examples 6 to 14) were carried out. The results of the printing tests are summarized in the following Table 3.

EXAMPLE 6

Comparative Example

The procedure of Example 1 was repeated except that the same amount of EVA ("Evaflex 45 x" commercially available from Mitsui DuPont Chemical KK; VA content =47% by weight, MFR=120, $\overline{M}n$=about 18,000) was used as a coating material. The resulting ink sheet showed an excessively increased adhesion strength of the ink to the printing sheet due to a high EV content of the EVA. During the printing, the ink sheet could not be peeled from the printed paper because of a strong bond therebetween.

EXAMPLE 7

Comparative Example

The procedure of Example 1 was repeated except that the same amount of vinyl chloride/vinyl acetate copolymer ("Zeon 400×150 ML" commercially available from Nihon Zeon KK) was used instead of the EVA as a coating material. The resulting ink sheet showed a good use repeatability, but a print density after the first print was unacceptably low. The low print density was due to a porous structure of the ink layer which was not melted upon heating for the thermal printing, and therefore, a substantial amount of the ink transferred to the printing paper was not so high enough to provide a satisfactory print density.

EXAMPLE 8

Comparative Example

The procedure of Example 1 was repeated except that the same amount of EVA ("Evaflex 360" commercially available from Mitsui DuPont Chemical KK; VA content =25% by weight, MFR=2, $\overline{M}n$=about 31,000) was used as a coating material. The resulting ink sheet showed a relatively good print density, but the fixing of the ink to the printing paper was poor. Practically, the ink on the printed paper was removed by rubbing with a finger. A microscopic inspection of the printed paper showed a cobwebbing of the ink. The formation of such cobwebbing is considered to be due to an increased viscosity of the ink caused by a higher molecular weight of the EVA.

EXAMPLE 9

Comparative Example

The procedure of Example 1 was repeated except that the same amount of EVA ("Evaflex 360" commercially available from Mitsui DuPont Chemical KK; VA content =14% by weight, MFR=2, $\overline{M}n$=about 27,000) was used as a coating material. The resulting ink sheet showed a blurred print, nonuniform transfer of the ink, and low print density. These drawbacks are considered to be due to a low EV content in the EVA, and accordingly an insufficient adhesion of the ink to the printing sheet.

EXAMPLES 10 TO 13

Comparative Examples

The procedure of Example 1 was repeated except that the composition of the ink components was changed as shown in the following Table 2. The results of the printing tests are summarized in the following Table 3.

TABLE 2

| Ink Components | Example 10 | Example 11 | Example 12 | Example 13 |
|---|---|---|---|---|
| carbon black | 55 | 30 | 10 | 2 |
| EVA | 7 | 3 | 75 | 45 |
| oil black | 6 | 11 | 8 | 9 |
| carnauba wax | 19 | 33 | 4 | 27 |
| montan wax | 13 | 23 | 3 | 17 |

For Example 10, a remarkably reduced print density was obtained because a release of the ink from the ink layer was prevented due to a rigid porous structure formed as a result of the excessively large amount of carbon black powders used.

For Example 11, a print density after the first printing was good, but the repeatability was very bad. This is considered to be because an intended structure was not formed due to an insufficient amount of the EVA did not completely cover a surface of the carbon black powders.

For Example 12, a tough structure of the resin was formed, but the intended porous structure was not formed because of an excessively large amount of EVA, and therefore, a very low print density was obtained.

For Example 13, a very bad repeatability was obtained because the intended porous structure was not formed due to an excessively small amount of the carbon black powders, and therefore, substantially all of the ink was transferred to the printing paper after one printing.

EXAMPLE 14

Comparative Example

The procedure of Example 1 was repeated except that the ink sheet was produced in accordance with the following procedure.

First, 30 parts by weight of carbon black ("Tokablack #8500"), 65 parts by weight of EVA ("Evaflex P-1207" commercially available from Mitsui DuPont Chemical KK; VA content=12% by weight, MFR=12, $\overline{M}n$ =about 28,000), 5 parts by weight of stearic acid amide and 400 parts by weight of toluene were dispersed for 8 hours in a ball mill. An ink composition thus prepared was wire bar-coated to a dry thickness of 10 μm on a surface of the polyester film having a thickness of 6 μm.

The printing test was made by the thermal printer of FIG. 9, and in accordance with the described procedure. Unsatisfactory printing results were obtained (see, Table 3).

As apparent from the results of the Table 3, a remarkably bad repeatability was obtained. This was considered to be because the colorant and EVA were simply mixed and therefore, an ink layer having the intended uniform and porous structure was not formed. Practically almost of the ink was transferred from the ink layer to the printing paper after the first printing.

Note, in the above-described Examples 1 to 14, the thermal printer used was a word processor, "OASYS-LITE FROM-10S" commercially available from Fujitsu Limited, the printing paper was PPC paper (Beck's smoothness =50 seconds) commercially available from Kishu Seishi KK, and the printing test was made in an atmospheric temperature of 25° C.

TABLE 3

| Example No. | Print density* (repeatability) After 1st printing | After 5th printing | After 10th printing | Sharpness of print** | Fixing of ink*** | Remarks |
|---|---|---|---|---|---|---|
| 1 | 1.3 | 1.1 | 1.0 | ○ | ○ | |
| 2 | 1.4 | 1.2 | 1.1 | ○ | ○ | |
| 3 | 1.2 | 1.1 | 1.0 | ○ | ○ | |
| 4 | 1.2 | 1.0 | 0.9 | ○ | ○ | |
| 5 | 1.1 | 1.0 | 0.9 | ○ | ○ | |
| 6 | inseparable adhesion of sheet to paper, not printable | | | | | |
| 7 | 1.1 | 0.8 | 0.5 | Δ | x | smearing, fuzzing |
| 8 | 0.6 | 0.5 | 0.4 | x | ○ | bad sharpness |
| 9 | 0.3 | 0.3 | 0.3 | x | ○ | insufficient density |
| 10 | 1.4 | 0.4 | 0.2 | ○ | x | bad repeatability |
| 11 | 0.3 | 0.3 | 0.3 | x | ○ | insufficient density |
| 12 | 1.1 | 0.2 | 0.2 | ○ | ○ | bad repeatability |
| 13 | 1.4 | 0.2 | 0.2 | ○ | ○ | bad repeatability |
| 14 | 0.8 | 0.7 | 0.6 | ○ | ○ | insufficient density |

Figure 16:
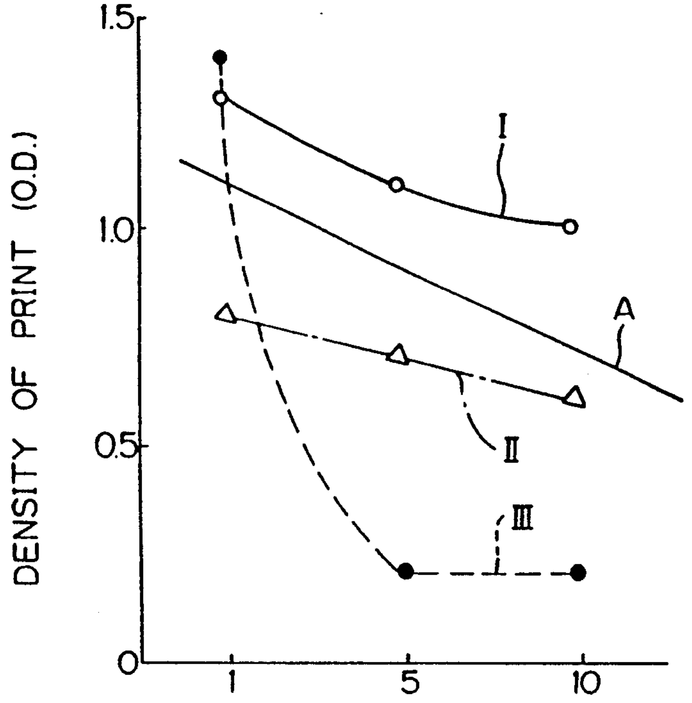
FIG. 16 is a graph showing the variation of the print density with the increase of an printing steps.

*O.D. (optical reflection density)
**○ . . . sharp print, Δ . . . unsharp, but readable, x . . . unreadable
***○ . . . no smearing, x . . . smearing Among these Examples 1 to 14, the results of the print density obtained in Examples 1, 7 and 14 were plotted in FIG. 16, in which lines I, II and III correspond to Examples 1, 7 and 14, respectively. Note, an area above line A shows a good print density and repeatability.

The above-described results of the Examples 1 to 14 show that:

(1) When the EVA copolymer is less than 5% by weight, the intended porous structure is not formed because the copolymer cannot completely cover the surface of each fine powder.

(2) When the copolymer is more than 70% by weight, the ink is not released from the ink layer, since the ink layer does not have the intended porous structure, but a rigid structure.

(3) When the fine powders are less than 3% by weight, a porous structure in which the powders together with the EVA copolymer are uniformly dispersed in the whole of the ink layer is not formed. The ink is wholly transferred from the ink layer to the printing paper after a single use of the ink sheet.

(4) When the fine powders are more than 50% by weight, the resulting ink layer is a hard and rigid structure which prevent the release of the portion of the ink from the ink layer, thereby lowering the print density.

EXAMPLE 15

This example is intended to explain the effect of the plasticizer in the ink composition.

The procedure of Example 1 was repeated except for the following items:

(1) A ball mill was used instead of the roll mill;

(2) 10 parts by weight of each of 46 plasticizers described in Table 4 was kneaded together with the oil black dye, carnauba wax and montan wax, but for comparison, no plasticizer was added (see, "control").

The performances of the resulting ink sheet were evaluated for the print density (after the first printing) and the sharpness of lengthwise ruled lines. The results of this evaluation are summarized in the following Table 4.

EXAMPLE 16

This example is intended to explain the effect of the plasticizer in the ink composition.

The procedure of Example 4 was repeated except for the following items:

(1) Tetrahydrofuran was used in an amount of 300 parts by weight instead of 30 parts by weight of the same.

(2) The same amount of "Seast 3M" was used as the carbon black pigment instead of "Tokablack #8500".

(3) 28 parts by weight of each of 46 plasticizers described in the Table 4 was dispersed together with the carbon black pigment, microcrystalline wax and methylethylketone, but for comparison, no plasticizer was added (see, "control").

(4) The ink layer of the ink sheet had a dry thickness of 9 μm.

The performances of the resulting ink sheet were evaluated for the print density (after the first printing) and the sharpness of lengthwise ruled lines. The results of this evaluation are summarized in the following Table 4.

EXAMPLE 17

This example is intended to explain the effect of the plasticizer in the ink composition.

The procedure of Example 5 was repeated except that in this example, 2 parts by weight of each of 46 plasticizers described in the Table 4 was used together with the phthalocyanine blue pigment and stearic acid amide, but for comparison, no plasticizer was added (see, "control").

The performances of the resulting ink sheet were evaluated for the print density (after the first printing) and the sharpness of lengthwise ruled lines. The results of this evaluation are summarized in the following Table 4.

Note, in each of Examples 15 to 17, the printing test was carried out using the printer of a word processor IIOASYSLITE FROM-10S" and PPC paper commercially available from Kishu Seishi KK, at an atmospheric temperature of 10° C.

TABLE 4

| | Print density after 1st printing** Example No. | | | Sharpness of lengthwise ruled lines*** Example No. | | |
|---|---|---|---|---|---|---|
| Plasticizer* | 15 | 16 | 17 | 15 | 16 | 17 |
| (1) | ◎ | ◎ | ◎ | ○ | ○ | ○ |
| (2) | ◎ | ◎ | ◎ | ○ | ○ | ○ |
| (3) | ◎ | ◎ | ◎ | ○ | ○ | ○ |
| (4) | ◎ | ◎ | ◎ | ○ | ○ | ○ |
| (5) | ◎ | ◎ | ◎ | ○ | ○ | ○ |
| (6) | ◎ | ◎ | ◎ | ○ | ○ | ○ |
| (7) | ◎ | ◎ | ◎ | ○ | ○ | ○ |
| (8) | ◎ | ◎ | ◎ | ○ | ○ | ○ |
| (9) | ◎ | ◎ | ◎ | ○ | ○ | ○ |
| (10) | ◎ | ◎ | ◎ | ○ | ○ | ○ |
| (11) | ◎ | ◎ | ◎ | ○ | ○ | ○ |
| (12) | ◎ | ◎ | ◎ | ○ | ○ | ○ |
| (13) | ◎ | ◎ | ◎ | ○ | ○ | ○ |
| (14) | ◎ | ◎ | ◎ | ○ | ○ | ○ |
| (15) | ◎ | ◎ | ◎ | ○ | ○ | ○ |
| (16) | ◎ | ◎ | ◎ | ○ | ○ | ○ |
| (17) | ◎ | ◎ | ◎ | ○ | ○ | ○ |
| (18) | ◎ | ◎ | ◎ | ○ | ○ | ○ |
| (19) | ◎ | ◎ | ◎ | ○ | ○ | ○ |
| (20) | ◎ | ◎ | ◎ | ○ | ○ | ○ |
| (21) | ◎ | ◎ | ◎ | ○ | ○ | ○ |
| (22) | ◎ | ◎ | ◎ | ○ | ○ | ○ |
| (23) | ○ | ○ | ○ | ○ | ○ | ○ |
| (24) | ○ | ○ | ○ | ○ | ○ | ○ |
| (25) | ○ | ○ | ○ | ○ | ○ | ○ |
| (26) | ○ | ○ | ○ | ○ | ○ | ○ |
| (27) | ○ | ○ | ○ | ○ | ○ | ○ |
| (28) | ○ | ○ | ○ | ○ | ○ | ○ |
| (29) | ○ | ○ | ○ | ○ | ○ | ○ |
| (30) | ○ | ○ | ○ | ○ | ○ | ○ |
| (31) | ○ | ○ | ○ | ○ | ○ | ○ |
| (32) | ○ | ○ | ○ | ○ | ○ | ○ |
| (33) | ○ | ○ | ○ | ○ | ○ | ○ |
| (34) | ○ | ○ | ○ | ○ | ○ | ○ |
| (35) | ○ | ○ | ○ | ○ | ○ | ○ |
| (36) | ○ | ○ | ○ | ○ | ○ | ○ |
| (37) | ○ | ○ | ○ | ○ | ○ | ○ |
| (38) | ○ | ○ | ○ | ○ | ○ | ○ |
| (39) | ○ | ○ | ○ | ○ | ○ | ○ |
| (40) | ○ | ○ | ○ | ○ | ○ | ○ |
| (41) | ○ | ○ | ○ | ○ | ○ | ○ |
| (42) | ○ | ○ | ○ | ○ | ○ | ○ |
| (43) | ○ | ○ | ○ | ○ | ○ | ○ |
| (44) | ○ | ○ | ○ | ○ | ○ | ○ |
| (45) | ○ | ○ | ○ | ○ | ○ | ○ |
| (46) | ○ | ○ | ○ | ○ | ○ | ○ |

TABLE 4-continued

| | Print density after 1st printing** Example No. | | | Sharpness of lengthwise ruled lines*** Example No. | | |
|---|---|---|---|---|---|---|
| Plasticizer* | 15 | 16 | 17 | 15 | 16 | 17 |
| None (control) | x | x | x | x | x | x |

Notes:
*refer to above description concerning the typical numbered examples of plasticizers
**O.D. ≧ 1.2 . . . ◎
1.2 > O.D. ≧ 1.0 . . . ○
O.D. < 1.0 . . . x
***solid line . . . ○
dotted line . . . x As apparent from the results of the above Table 4, the presence of the plasticizer in the ink composition effectively improves both the print density and the sharpness of the resulting prints at a lower temperature, and a wide variety of the plasticizers can be advantageously used in the practice of the present invention.

Figure 18:
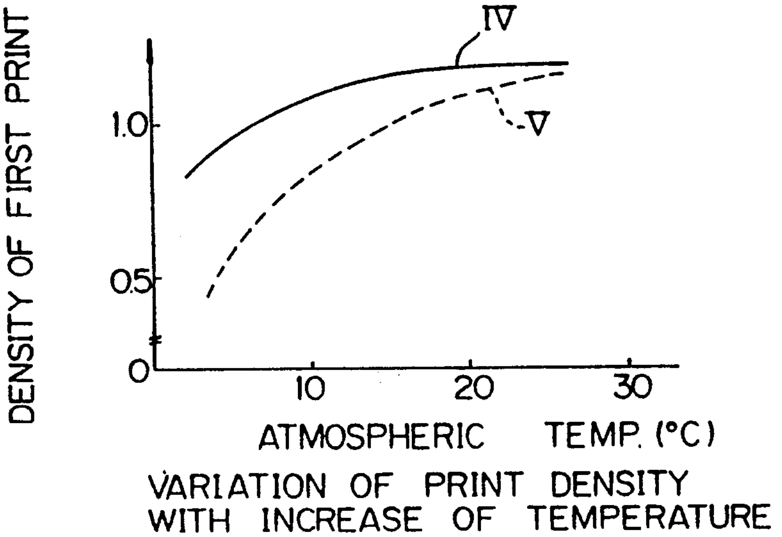
FIG. 18 is a graph showing the variation of the print density with an elevation of the temperature.

FIG. 18 is a graph showing variations of the print density with increase of the temperature with respect to the ink sheet of Example 15 (see, the solid line IV) and a control thereof (see, the dotted line V). The graph of this figure shows that the presence of the plasticizer is particularly effective when printing at a lower temperature.

Figure 19:
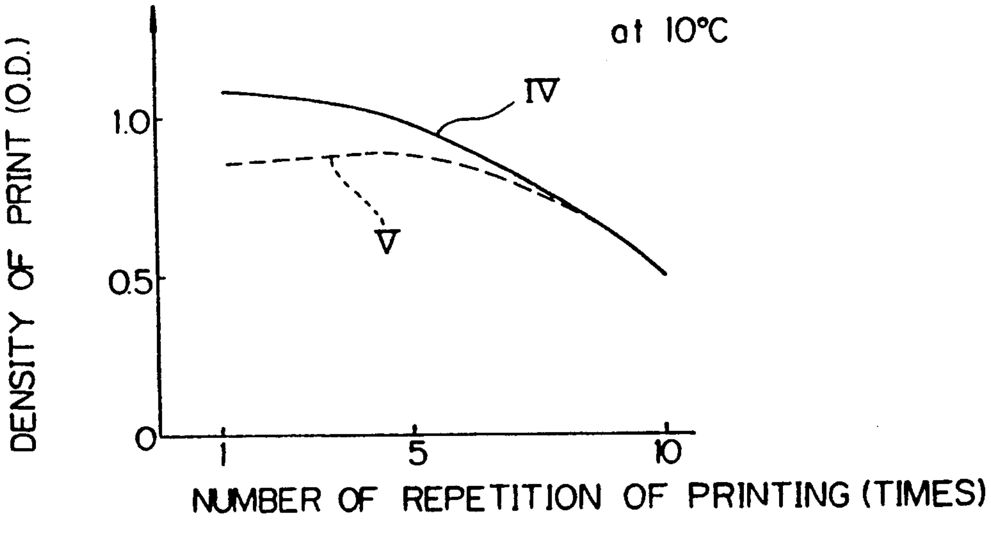
FIG. 19 is a graph showing the variation of the print density with an increase of the printing steps.

FIG. 19 is a graph showing a variation of the print density with an increase of the printing steps with respect to the ink sheet of Example 15 (see, the solid line IV) and a control thereof (see, the dotted line V). The graph of this figure shows that the presence of the plasticizer is particularly effective for increasing the print density at an initial stage of the repeated printing.

EXAMPLE 18

This example is intended to explain the combined use of the EVA with 18 to 26% by weight of VA and the EVA with 27 to 45% by weight of VA in the ink composition.

First, 20 parts by weight of carbon black, "Ceast 3M", 10 parts by weight of EVA "Evaflex 410" containing 19% by weight of VA and 10 parts by weight of EVA containing 33% by weight of VA were dispersed in a roll mill and then pulverized to obtain EVA-coated carbon black powders. An electron microscopic examination of the resulting fine powders showed that a surface of each powder contained a coating of the EVA. Further, when the fine powders were stirred in toluene, a black solution having no coarse particles was obtained. This shows that the carbon black, as a core of the EVA-coated fine powders was finely dispersed in the solution.

Then, 10 parts by weight of oil black dye "Aizen Sot Black 3", 30 parts by weight of carnauba wax and 20 parts by weight of montan wax were kneaded at 100 in a roll mill. The mixture was admixed with a total amount of the previously prepared EVA-coated carbon black powders, and the mixture was further kneaded for 30 minutes to obtain an ink composition.

The thus obtained ink composition was hot melt-coated on a polyester film having a thickness of 6 μm to obtain an ink sheet having an ink layer having a thickness of 10 μm.

EXAMPLE 19

This example is intended to explain the combined use of the EVA with 18 to 26% by weight of VA and the EVA with 27 to 45% by weight of VA in the ink composition.

First, 25 parts by weight of carbon black "Seast 3M", 10 parts by weight of EVA containing 25% by weight of VA, 10 parts by weight of EVA "Evaflex 40Y" containing 41% by weight of VA and 300 parts by weight of tetrahydrofuran were dispersed for 8 hours in a ball mill, and then the tetrahydrofuran was evaporated off obtain EVA-coated carbon black powders.

Then, 10 parts by weight of carbon black pigment "Tokablack #8500", 35 parts by weight of microcrystalline wax and 400 parts by weight of toluene were added to 55 parts by weight of the previously prepared EVAcoated carbon black powders, and the mixture was kneaded for 4 hours in a ball mill to obtain an ink composition.

The thus obtained ink composition was hot melt-coated on a polyester film having a thickness of 6 μm to obtain an ink sheet having an ink layer having a thickness of 10 μm.

In each of the Examples 18 and 19, the resulting ink sheet was tested by the thermal printer of: word processor IIOASYSLITE FROM-11D", commercially available from Fujitsu Limited, to determined the performances thereof with respect to the printing of character patterns and solid black patterns. The results of this print test are summarized in the following Tables 5 and 6.

TABLE 5

| | Results of character Pattern Printing | | | | |
|---|---|---|---|---|---|
| | print density | | | | |
| Example No. | after 1st printing | after 5th printing | after 10th printing | sharpness* | fixability of ink** |
| 18 | 1.3 | 1.1 | 0.9 | ○ | ○ |
| 19 | 1.4 | 1.1 | 0.9 | ○ | ○ |

Notes:
*○ . . . good sharpness
**○ . . . no smearing after rubbing with finger

TABLE 6

| | Results of Solid Black Printing | | |
|---|---|---|---|
| | print density* (after 1st printing) | | adhesion of ink sheet to |
| Example No. | left end | right end | paper |
| 18 | 1.3 | 1.3 | No |
| 19 | 1.4 | 1.4 | No |

Note:
*After the stripe pattern having a length of 150 mm was printed, the print density at a left end of the printed paper was compared with that at a right end of the printed paper.

The solid black patterns were sharply printed on the printing paper without drawbacks, as in the printing for the character or symbol patterns. In addition, no adhesion of the ink sheet to the printing paper was caused.

EXAMPLE 20

This example is intended to explain the effect of the light stabilizer in the ink composition.

The procedure of Example 1 was repeated except that 15 parts by weight of each of 16 light stabilizers previously described as typical examples thereof was kneaded together with the oil black dye, carnauba wax and montan wax.

The resulting ink sheet was left to stand in a high temperature atmosphere of 60° C. and 10% R.H. for a predetermined storage time, and thereafter, the stored ink sheet was used in the PPC thermal printing by the thermal printer of the "OASYSLITE 30AF III" in the atmosphere of 25° C. and 50% R.H. The satisfactory results plotted in FIG. 21 were obtained. Namely, as shown by the solid line VI in an upper graph of FIG. 21, a high level of print density was stably maintained for about 460 hours. In addition to the improvement of the print density, as shown by the solid line VIII in a lower graph of FIG. 21, smearing of the wax was prevented for about 200 hours. Note, the solid lines VI and VIII were plotted from an average of the results obtained from the 16 light stabilizers used.

EXAMPLE 21

The procedure of Example 20 was repeated except for the following items:

(1) The amount of the light stabilizer used was varied to find a suitable range thereof.

Figure 22:
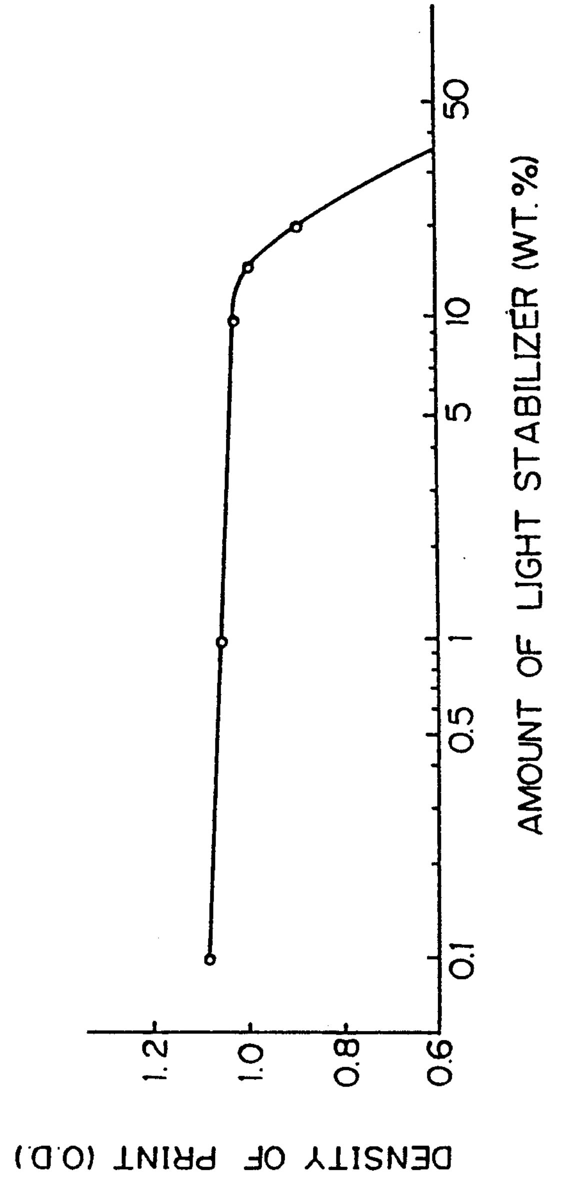
FIG. 22 is a graph showing the effect of the UV absorber on the print density.

(2) The ink sheet was left to stand at 60° C. and 10% R.H. for 150 hours. The results plotted in FIG. 22 were obtained in the printing test. These results indicate that satisfactory results can be obtained if the light stabilizer is used in an amount of about 0.1% to 15% by weight of the total amount of the ink composition.

EXAMPLE 22

First, 20 parts by weight of carbon black "Seast 3M" and 20 parts by weight of EVA "Evaflex 250" were dispersed at 120° C. for 2 hours in a ball mill, after cooling, the mixture was pulverized to obtain EVA-coated carbon black powders.

Then, 20 parts by weight of oil black dye "Aizen Sot Black 3", 30 parts by weight of carnauba wax and 20 parts by weight of montan wax were kneaded at 100° C. for one hour in a roll mill, and further kneaded for 30 minutes after the addition of the EVA-coated carbon black powders previously prepared. The mixture was cooled to obtain a solid colloid consisting of the EVA-coated fine powders and the ink material.

The solid colloid was pulverized, and after the addition of 300 parts by weight of toluene, the mixture was dispersed for one hour in a stirring apparatus to obtain a coating solution.

The thus obtained coating solution was coated on a polyester film having a thickness of 6 82 m to obtain an ink sheet having an ink layer having a dry thickness of 10 μm.

The printing test of the ink sheet was made by the thermal printer of the "OASYSLITE FROM-11D". The O.D. value (optical reflection density) of the prints was 1.3 (after the first printing), 1.1 (after the fifth printing) and 0.8 (after the tenth printing). Nonevenness of the printing was observed.

We claim:

1. A process for the production of a reusable, heat transfer recording ink sheet which comprises providing an ink which contains:

at least one dye and/or pigment as a colorant;

a low melting compound as a vehicle; and fine powders coated with ethylene/vinyl acetate copolymer and having a particle size of 0.01 to 200 μm, by dispersing the powders in a mixture of the dye and/or pigment and the low-melting compound, and coating said ink on a substrate, the ethylene/vinyl acetate copolymer having a number average molecular weight of 30,000 or less and containing vinyl acetate units in an amount of 18 to 45% by weight of the copolymer.

2. A production process according to claim 1, in which the ink is coated onto the surface of the substrate in the absence of an interlayer to form an ink layer having a thickness of 2 to 20 μm.

3. A production process according to claim 1, in which the ethylene/vinyl acetate copolymer is a combination of a first ethylene/vinyl acetate copolymer having a number average molecular weight of 30,000 or less and containing vinyl acetate units of 18-26 by weight of the copolymer and a second ethylene/vinyl copolymer having a number average molecular weight of 30,000 or less and containing vinyl acetate units of 27 to 45% by weight of the copolymer.

4. A production process according to claim 1, in which the dye and/or pigment is used in the range of 4 to 50% by weight of the total amount of the ink.

5. A production process according to claim 1, in which the low melting compound is used in the range of 5 to 80% by weight of the total amount of the ink.

6. A production process according to claim 1, in which the ethylene/vinyl acetate-coated fine powders are used in the range of 3 to 50% by weight of the total amount of the ink.

7. A production process according to claim 1, in which the ethylene/vinyl acetate-coated fine powders are prepared by blending the uncoated fine powders and the ethylene/vinyl acetate in accordance with a hot melt dispersion method and pulverizing the dispersion.

8. A production process according to claim 1, in which the ethylene/vinyl acetate-coated fine powders are prepared by dispersing the uncoated fine powders and the ethylene/vinyl acetate in a solvent in accordance with a solvent dispersion method and pulverizing the dispersion.

9. A production process according to claim 1, in which after the preparation of each of the ethylene/vinyl acetate-coated fin powders and the mixture of the dye and/or pigment and the low-melting compound, they are blended in accordance with a hot melt dispersion method and the dispersion is coated on the substrate surface in accordance with a hot melt coating method to form an ink sheet.

10. A production process according to claim 1, in which after the preparation of each of the ethylene/vinyl acetate-coated fine powders and the mixture of the dye and/or pigment and the low-melting compound, they are blended in accordance with a solvent dispersion method and the dispersion is coated on the substrate surface in accordance with a solvent coating method to form an ink sheet.

11. A production process according to claim 1, in which after the preparation of each of the ethylene/vinyl acetate-coated fine powders and the mixture of the dye and/or pigment and the low-melting compound, they are blended in accordance with a hot melt dispersion method, the dispersion is pulverized and the resulting powders are coated on the substrate surface in accordance with a solvent coating method to form an ink sheet.

* * * * *